United States Patent [19]

Fischer et al.

[11] 4,313,201

[45] Jan. 26, 1982

[54] TESTED, DISSIMILAR HELICOPTER STABILITY AUGMENTATION

[75] Inventors: William C. Fischer, Monroe; Albert Sivahop, Stratford, both of Conn.

[73] Assignee: United Technologies Corporation, Hartford, Conn.

[21] Appl. No.: 127,332

[22] Filed: Mar. 5, 1980

[51] Int. Cl.³ .................... G06F 11/16; G06F 11/22
[52] U.S. Cl. .................................. 371/68; 244/194; 318/564; 364/434; 371/9; 371/25
[58] Field of Search ............... 371/8, 9, 20, 25, 68; 244/194; 364/119, 434, 579, 580, 601; 318/563, 564, 565

[56] References Cited

U.S. PATENT DOCUMENTS

| | | | |
|---|---|---|---|
| 3,688,099 | 8/1972 | Buscher | 371/25 |
| 3,719,336 | 3/1973 | Fowler et al. | 244/194 |
| 4,032,757 | 6/1977 | Eccles | 371/68 |
| 4,095,763 | 6/1978 | Builta | 244/194 |
| 4,115,847 | 9/1978 | Osder et al. | 244/194 |
| 4,117,317 | 9/1978 | Dooley, Jr. et al. | 371/68 |
| 4,130,241 | 12/1978 | Meredith et al. | 318/564 |

*Primary Examiner*—Charles E. Atkinson
*Attorney, Agent, or Firm*—M. P. Williams

[57] ABSTRACT

The main roll and yaw axes of a helicopter having a main rotor operative in response to cyclic and collective pitch commands and a tail rotor operative in response to pitch commands, include stability inputs to actuators which are selectively provided by an analog channel, a digital channel, or one half by each, the digital channels being manifested in a digital computer system which includes programs of self-test, in-flight comparison between the inputs and outputs of corresponding analog and digital channels, and ground tests of testable rate gyro inputs to the various digital and analog channels and the outputs thereof.

2 Claims, 2 Drawing Figures

TESTED, DISSIMILAR HELICOPTER STABILITY AUGMENTATION

The Government has rights in this invention pursuant to Contract No. N00019-77-C-0202 awarded by the Department of the Navy.

DESCRIPTION

1. Technical Field

This invention relates to helicopter systems employing digital and analog redundant stability augmentation system channels, and more particularly to digital testing and comparison of corresponding stability augmentation system channels.

2. Background Art

In U.S. Pat No. 3,732,501, a dual analog servo control system, of a type useful in the stability augmentation systems of a helicopter, provides two analog amplifier channels driving a single load and responsive to feedback through that load. In the event of failure of one of the amplifiers, the other will provide the load with suitable current; at worst, the load current is driven to zero, which is a safe condition for stability augmentation systems. In U.S. Pat. No. 4,270,168 there is disclosed a dual digital control system which controls, inter alia, the stability augmentation for a helicopter. In this system, each digital channel can provide half gain to a single stability axis (such as pitch, roll or yaw) or, if one of the systems is inoperative, the other system can provide full gain to that particular axis. The dual analog system of the former patent is relatively simple and self-operative. However, it is very difficult to implement self-test and failure mode indications in such an analog system. On the other hand, the dual digital systems inherently provide relatively simple access to self-testing and to fault analysis, but are themselves extremely complex systems. In addition, the use of two or more digital computers requires a scheme of taking into account the action of each, comparing the indications from each, and deciding what is to be done. Such systems may take a wide variety of control concepts, such as the identical-equality concept of the aforementioned digital patent, master/slave systems, majority voting systems and the like.

Another type of system which is currently in use achieves a somewhat higher degree of redundancy with relative simplicity by using dissimilar systems. This type of system employs analog and digital channels, which provides completely different types of failure modes in each of the two channels which are controlling one of the axes. The analog channels are totally independent of each other, mitigating any likelihood that more than one axis will fail at the same time. The likelihood that a failure in an analog channel amplifier would occur at the same time as a failure of that portion of a digital computer which is helping to control the same stability augmentation system axis is more remote than that two such amplifiers might have the same type to failure at the same time. Complexity is reduced because there is no need to have a hierarchal scheme of interrelationships between digital computers, since there is only a single digital computer. This type of system provides a higher degree of redundancy, due to dissimilarity of the two channels controlling each axis, provides the simplicity of analog systems, but also suffers from the same deficiency of dual analog systems in that there is no knowledge as to whether only one or both of the dissimilar channels controlling a particular axis are operational, since they fail operationally with degraded performance.

DISCLOSURE OF INVENTION

Objects of the invention include provision of a stability augmentation system for a helicopter having dissimilar redundant channels controlling each stability axis, including self-test and comparative monitoring capability, with a minimum of complexity.

According to the present invention, each of three axes (pitch, roll and yaw) of stability augmentation in a helicopter are controlled by an analog channel and a digital channel, the digital channel being implemented in a digital computer system that provides preflight testing of testable gyros and in-flight comparison between the analog and digital channels of the respective axes. According to the present invention, both the digital and the analog channels of each of the axes are responsive to testable rate gyros which provide a determined output in response to a test input during preflight testing. According still further to the invention, the rate output of the analog and digital channel gyros for each axis are compared with each other during in-flight monitoring. In still further accord with the present invention, the command values generated in one channel of each axis can be compared with the command values generated by the other channel of the same axis during in-flight monitoring.

The present invention provides the additional redundant safety of having each axis operated both in response to an analog channel and a totally dissimilar digital channel, provides the test and monitoring assurances that are practical only with a digital system, both over the analog channel and the digital channel, and avoids the complexity of a hierarchal multi-computer digital system. The invention is readily implemented in a variety of forms, utilizing apparatus and techniques which are readily available in the art in the light of the teachings which follow hereinafter.

The foregoing and other objects, features and advantages of the present invention will become more apparent in the light of the following detailed description of an exemplary embodiment thereof, as illustrated in the accompanying drawings.

BEST MODE FOR CARRYING OUT THE INVENTION

Figure 1:
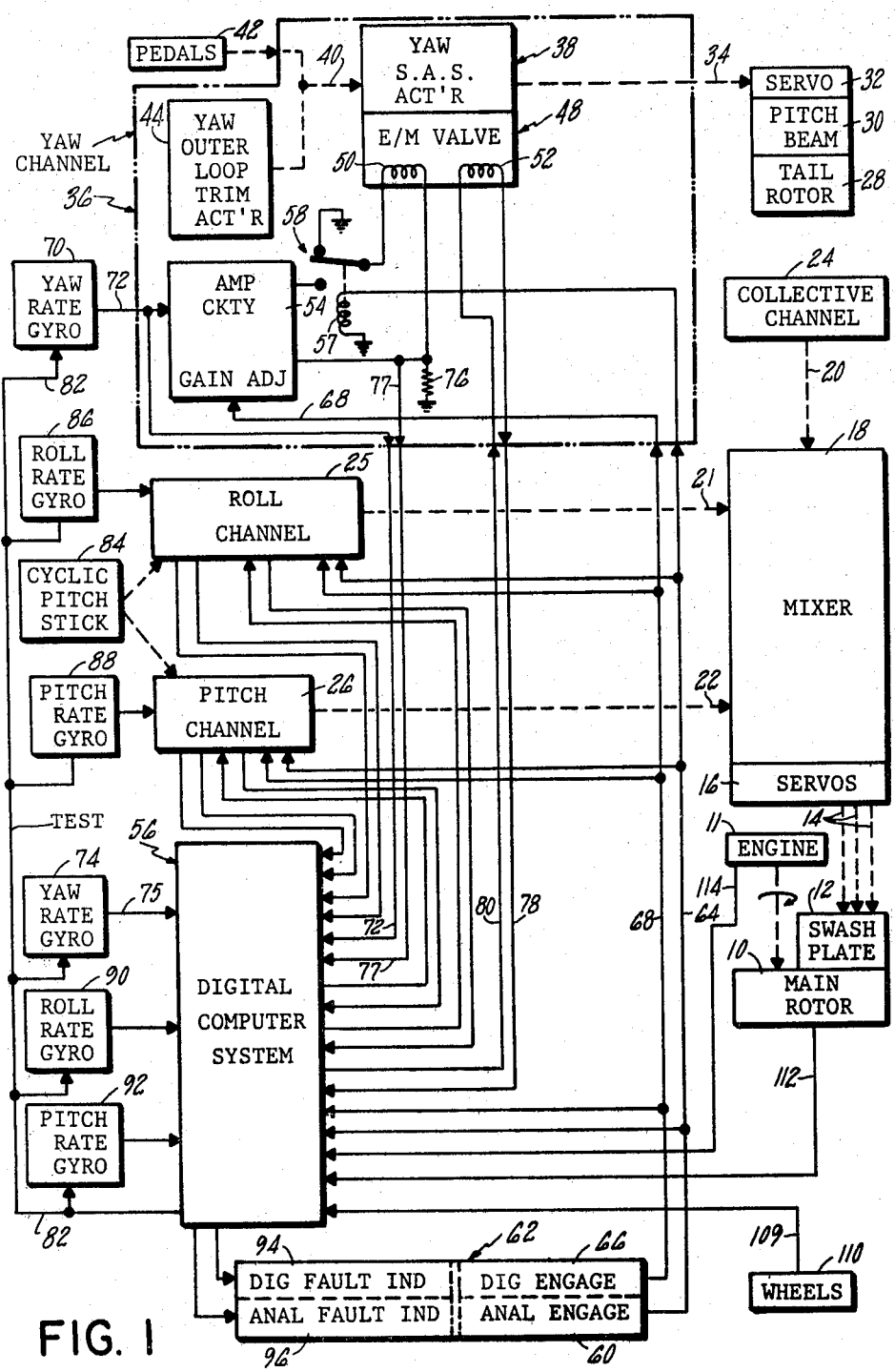
FIG. 1 is a simplified schematic block diagram of a three axis helicopter stability augmentation system employing self-testing redundant analog and digital channels.

Referring now to FIG. 1, the blades of a main rotor assembly 10, rotated by an engine 11, are caused to have varying pitch in response to the tilt attitude of a swash plate 12 which is tilted at each of three support points 14 in mechanical response to servos 16. The servos drive the three support points of the swash plate 12 in response to a mixer 18 which converts three mechanical inputs 20-22 thereto, indicative of the outputs of a collective pitch channel 24, a roll channel 25 and a pitch channel 26, into the mixed commands required to effect the desired pitch of the main rotor blades.

The blades on the tail rotor 28 of the helicopter are adjusted in pitch by a pitch beam 30 in response to a servo 32 which in turn is responsive to a mechanical input thereto 34 from a yaw channel 36.

The yaw channel 36 (as well as the other channels) may take a variety of forms, as is well known in the art, one typical form including a stability augmentation system actuator 38 which is in line with mechanical connections 40 which can be driven either by pedals 42 or by an automatic flight control system portion, such as the yaw outer loop trim actuator 44. The pedals 42 and trim actuator 44 are called the outer loop control since they are interconnected by the mechanical connections 40 such that any motion induced by the trim actuator 44 is apparent in the pedals 42. On the other hand, the stability augmentation system actuator 38 modifies the mechanical signal applied as an input 34 to the servo 32 without affecting the position of the linkage 40, and is therefore referred to typically as an inner loop control. As is known, stability augmentation systems frequently have a very fast response time (such as 200% of authority per second) but an overall limit on authority (such as 10% of pilot authority). This fast response is achieved by means of an electromechanical valve 48 which drives the actuator 38 in response to magnetic servo valve coils 50, 52 which control the flow of hydraulic fluid under pressure from a source (not shown) into the actuator 38.

In a typical single channel per axis system, only one valve coil 50, 52 is required; but in the dual redundant systems described hereinbefore, such as that in the aforementioned digital system, dual coil valves for the stability augmentation actuators are well known. In such systems it has been known to drive both coils with half gain, or in the event that one of the two channels for the given axis has failed, to drive the remaining operable coil with full gain while there is no input to the other coil.

In accordance with the invention, one of the coils 50 is driven by an analog amplifier circuitry 54 while the other of the coils 52 is driven by a digital computer system 56, selectively in dependence upon the engagement of the related circuitry 54 or computer 56, as the case may be. In particular, the coil 50 will be driven by the amplifier circuitry 54 when a relay coil 57 is energized, thereby causing a contact 58 to be transferred from the grounding position as shown to the opposite position at which it is connected with the amplifier circuitry 54. But when the analog channel for the yaw axis is disengaged, the coil 57 will be de-energized and the contact 58 will ground the valve coil 50, as illustrated in the drawing. The relay 57, 58 is typically mounted within the amplifier circuitry 54, but is shown external thereto for clarity in FIG. 1.

Although not shown, the digital computer system 56 has a similar hardware connection to the coil 52 as that (57, 58) described with respect to the amplifier circuitry 54 and the coil 50. A computer having output circuitry of this type is disclosed in the aforementioned digital patent disclosure. When the analog stability augmentation system is engaged, such as by a switch 60 in a control panel 62 (bottom of FIG. 1), an engage signal on a line 64 will operate the relay coil 57. If in addition, the digital stability augmentation system is also engaged, such as by a switch 66 in the control panel 62, then a digital engage signal on a line 68 will cause the gain of the amplifier circuitry 54 to be half of its normal or maximum gain, whereby the amplifier circuitry 54 and the digital computer system 56 will each supply to each of the corresponding valve coils 50, 52, one half of the total current necessary to operate the E/M valve 48.

The present invention provides monitoring of the input and the output of the amplifier circuitry 54. For instance, the amplifier circuitry 54 is fed by a yaw rate gyro 70 on an output line 72 which is also connected to the digital computer system 56 so as to permit monitoring the magnitude of the signal applied by the yaw rate gyro 70 to the amplifier circuitry 54. In a similar fashion, a yaw rate gyro 74 is connected by a line 75 to the digital computer system 56 in a fashion as disclosed in the aforementioned computer patent disclosure, to both provide the input for generating the command signal for the valve coil 52 and to provide comparison monitoring capability for comparison with the output on the line 75 of the gyro 74 with the output on the line 72 of the gyro 70 during in-flight monitoring of the health of the system. Since the digital computer system 56 may be implemented in a wide variety of fashions, with suitable gyro inputs, output controls and the like, as described most particularly with respect to FIGS. 1 and 2 of the aforementioned digital computer disclosure, no further detail is necessary nor given herein.

The effect of the amplifier circuitry 54 on the coil 50 is monitored by sensing the voltage developed across a resistor 76 on a line 77 and applying that to the digital computer system 56. In a similar fashion, the signal on a line 78 supplying the return path from the valve coil 52 is monitored by the digital computer system 56 (in a manner described with respect to FIG. 2 of the aforementioned digital computer disclosure) so as to provide two signals on the lines 77, 78 for comparing the command given to the coils 50, 52 during in-flight monitoring.

For preflight testing, the yaw rate gyro 70 may respond to a gyro test signal on a line 82 which is provided by the digital computer system 56 in a manner described more particularly with respect to FIG. 2 hereinafter. The signal on the line 82 causes the specifically designed gyro to be torqued, to provide an output equal to about half of its full scale in a given rate direction, which output is transmitted over the line 72 for checking by the digital computer system 56. As is known, the typical rate gyro includes a spinning motor with a pick-off which provides a variable frequency signal, indicative of the rotation rate, which is converted by a demodulator and a filter so as to provide a DC voltage, the magnitude of which is indicative of the rate of rotation. To provide a testable rate gyro, a torquer, operable in response to the test signal line 82, is included. There are several varieties of testable rate gyros available in the market. One of them is Model 402525, International Time Corporation, Waterbury, Conn., U.S.A.

The roll channel 25 and pitch channel 26 are nearly identical to the yaw channel 36 which has been described, except for the gain constants and time constants provided within the amplifier circuitry 54 and the nature of signals provided to the trim actuator 44; additionally, the roll and pitch channels 25, 26 are both operable in response to the cyclic pitch stick 84, as is known in the art, rather than in response to pedals 42. Each of these channels is also responsive to a related rate gyro 86, 88 which is suitably disposed to be sensitive to roll or pitch, respectively, with the desired characteristics. The digital computer system 56 is similarly responsive to a roll rate gyro 90 and a pitch rate gyro 92. Thus, in each of the three axes (pitch, roll and yaw) there are two channels (analog and digital) each driving one of the servo valve coils (50, 52, and the like) of the related stability augmentation system actuator (38, and the like). Each of the analog channels is implemented by means of well known amplifiers and hydraulic servos as described with respect to the yaw channel 36, and each digital channel may be implemented with a computer system 56 which is essentially the same as one of the computers in the aforementioned digital patent disclosure, the digital valve coil (similar to the valve coil 52 herein) for the roll channel 25 herein being equivalent to the valve coil 68 of the roll inner loop valve 69 which is illustrated in FIGS. 1 and 2 of the aforementioned digital patent disclosure. The engagement and disengagement of the digitally-actuated roll valve coil may be in the fashion described with respect to the coil 68 in FIG. 2 of the aforementioned digital patent disclosure. And, the calculation for the digital channel of the roll axis may be a simplified version (not accommodating switch over of roll rate input information) of the process disclosed in FIG. 16 of the aforementioned digital patent disclosure. In fact, the digital requirements for the present invention are far simpler than for the more complicated, dual digital system disclosed in the aforementioned digital patent disclosure.

The control panel 62 may have a digital fault indicator 94 and an analog fault indicator 96, operable as described more particularly with respect to FIG. 2 hereinafter, to indicate failure of either the digital channels or the analog channels of the stability augmentation system. This will allow, in the disclosed embodiment, the pilot to disengage either or both of the channels by means of the switches 60, 66.

Figure 2:
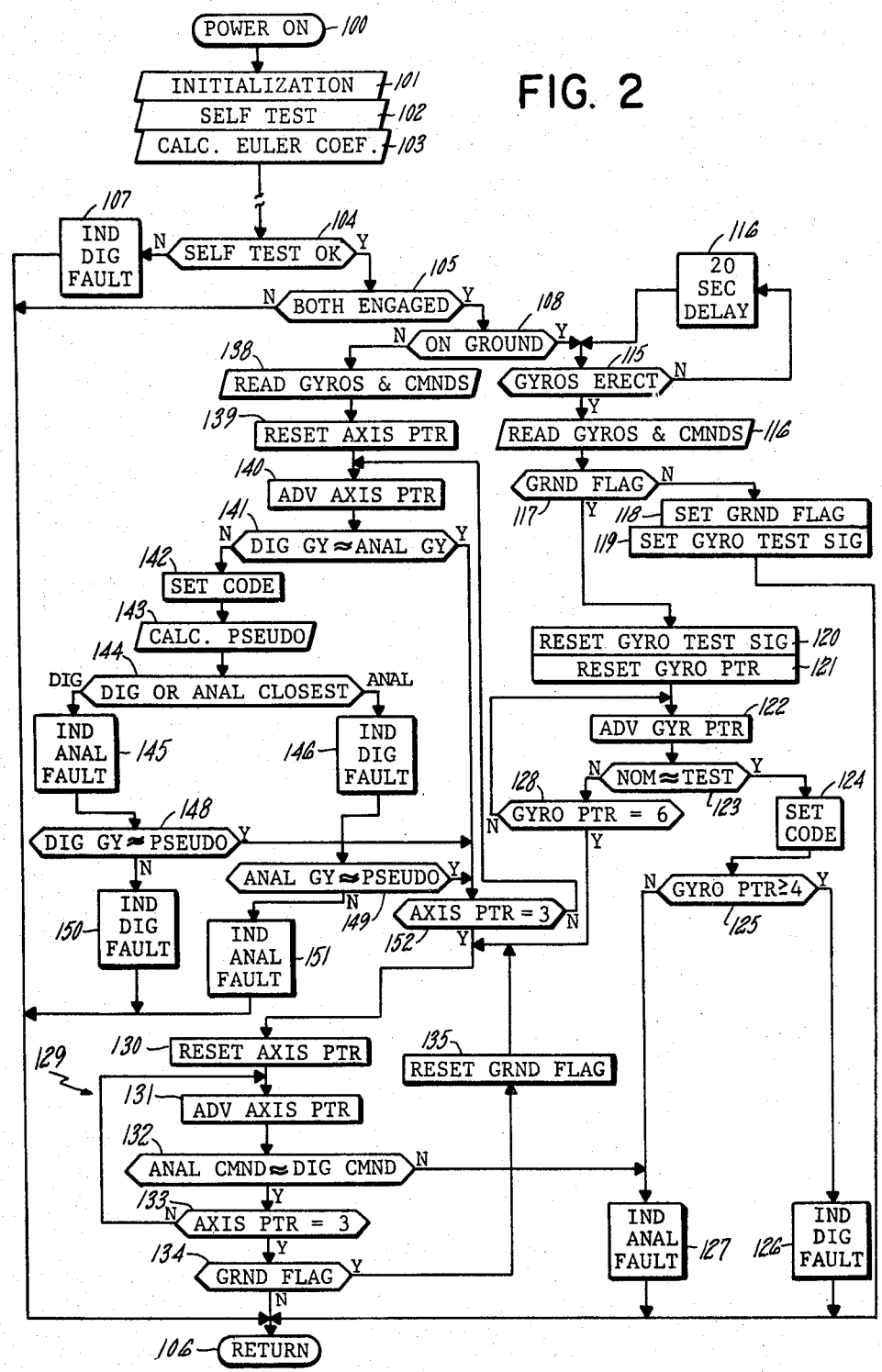
FIG. 2 is a simplified logic flow diagram exemplary of operations performed by the digital computer system in the implementation of the embodiment of FIG. 1.

Referring now to FIG. 2, a simplified overall logic flowchart for operations of the digital computer in implementing the embodiment described with respect to FIG. 1, commences by program entry through a power on entry point 100 which will cause normal computer initialization routines 101 to be performed. Depending upon the manner in which the sequencing of program routines is effected in the digital computer, certain steps and functions may be performed before others, and in many cases the particular order is not important, since any data which need be acted upon in a given cycle may be either generated in that cycle or may have been generated in a next preceding cycle in a control system, such as stability augmentation, of the type disclosed herein. However, the system may also be arranged so that the utility programs (such as calculating the digital component of roll stability augmentation) may be performed in response to timed interrupts as in the aforementioned digital patent disclosure, utilizing all of the background time (between interrupts) for self-test routines, such as memory check sum, and the like. Thus, in FIG. 2, self-test subroutines 102 are indicated as being performed so as to provide discrete information concerning whether or not the computer deems itself to be healthy and capable of performing the stability augmentation system functions and the preflight and in-flight test and monitoring functions which are about to be described. Also, one utility program 103 may calculate Euler coefficients (sines and cosines of earth-axis vertical and roll channel outputs of the vertical gyro and of heading) for us in generating pseudo aricraft-axis pitch rate, roll rate and yaw rate, for use as described hereinafter. If there has been no indication of computer failure as a consequence of performing the self-test routines 102, a test 104 will be affirmative, and a test 105 will determine whether both the digital and analog channels are engaged. If they are not, there is no reason to perform preflight testing, so that routine bypasses to other parts of the program through a return point 106. Similarly, if the computer self-tests performed in the routines 102 indicate that the computer has failed, the test 104 will be negative and a step 107 will set the digital fault indicator 94 (in the control panel 62, FIG. 1) and the program will simply advance through the return point 106 to other parts of the program of the computer.

If tests 104 and 105 indicate that the computer has not failed and both stability augmentation system channels (analog and digital) are engaged, then a test 108 determines the helicopter is on the ground. This test responds to three factors. First, whether there is weight on the wheels of the helicopter, as may be indicated to the computer by a signal on a line 109 (FIG. 1) which is attached to the suspension structure of the wheels 110 (FIG. 1); if there is weight on the wheels, this indicates that the helicopter is on the ground. Second, whether the rotor is braked, as may be indicated by a signal on a line 112 from the main rotor assembly 10 (FIG. 1); this indicates that the rotor should not be moving. Third, whether there is no engine torque applied to the rotor, which may be determined by a signal on a line 114 from the engine 11 (FIG. 1); this means that it is unlikely that the rotor will begin to turn (over the resistance of the brake). If test 108 is affirmative, this indicates that it is safe to provide inputs into the stability augmentation system, since they will have no dangerous effect on the aircraft. Therefore, preflight testing of the gyros is permitted. This therefore leads to a test 115 which determines, from one or more gyro output signals such as on the signal line 72, whether the gyros are erected; if they are not, a step 116 will provide a twenty second delay and then the test 108 will be repeated. Eventually, test 115 will be affirmative so that testing of the gyros themselves may be performed. The ground testing of the gyros, in accordance with a first aspect of the invention, is accompanied by ground testing of the commands generated by the analog and digital portions of the various axes in response to the gyros. When the gyros are first erected, they will have nominal outputs; if the helicopter is in fact standing on an earth-based platform, the gyro outputs should be zero (null); if the helicopter is standing on the deck of a ship, the gyros may be indicating very slow rates, due to the relatively slow motion that the ship may have. The ground testing includes comparing each gyro's test output with the same gyro's nominal output, and comparing the digital command generated for each axis with the analog command generated for each axis, both with nominal gyro outputs and with gyro test outputs. However, in order to ensure that a failure in command comparison (if any) is not due to the fault of a gyro, the comparison of each gyro nominal and test output is performed before the command tests are performed.

In FIG. 2, once test 115 indicates that the gyros are erected and ground testing can begin, a subroutine 116 reads the gyros and the commands for both the analog and digital portions of all of the axes. Then, a test 117 determines if a ground flag has been set. This is a flag that keeps track of the advancement through the ground testing, as described hereinafter. In the first pass through the ground tests, the ground flag is always in the reset state. Therefore, the initial pass through test 117 will be negative causing step 118 to set the ground flag and causing step 119 to establish the gyro test signal (on line 82, FIG. 1), so that each of the rate gyros will be torqued and provide an output as described with respect to FIG. 1 hereinbefore. Depending upon how the program is implemented, this may complete the first pass through the test routine of FIG. 2 in order to allow time for the gyro test signal to provide stable outputs from each of the gyros. On the other hand, as is described more fully in the aforementioned digital patent disclosure, the setting of the gyro test signal may occur in a ground test program which is reached only every second or every fourth complete computer program cycle, thereby providing ample time for stabilizing the operation of the gyros in response to the test signal. In the embodiment herein, setting of the gyro test signal finishes the first pass through the ground test portion, and other portions of the computer program are reached through the transfer point 106.

In the next subsequent pass, assuming that tests 104, 105, 108 and 115 are still affirmative, step 116 will again cause the gyros and the commands of both the digital and analog portions of each of the three axes to be read into the computer. This time, however, the gyro outputs are test outputs, and the commands are those generated in response to the gyro test outputs. And, in this pass, test 117 is affirmative so a step 120 will reset the gyro test signal so that it will no longer be applied to the gyros. Then a step 121 resets a pointer used to count through all six of the gyros, and a step 122 will advance the pointer to cause it to set to the first gyro (such as the pitch rate gyro 88, FIG. 1, which relates to the analog portion of the pitch channel). Then the nominal output (which is read into the computer by the subroutine 116 before application of the gyro test signal) is compared with the test output (which is read into the computer by the subroutine 116 after the test signal is generated); if the nominal and test gyro outputs are within a threshold amount of each other, a comparison test 123 is affirmative; but if the signals are too diverse from each other, test 123 will be negative and a step 124 may set a code indicating a gyro failure and including the setting of the gyro pointer to indicate which gyro failed. This code may be used by maintenance personnel in repairing the system. Then a test 125 will determine whether the analog gyros designated as one, two and three, (here assumed to be the gyros 88, 86, and 70, respectively), or gyros designated four, five and six (here assumed to be gyros 92, 90 and 74, respectively) caused the failure of the test 123, dependent upon the setting of the gyro pointer. If the pointer is set to four or more, one of the digital gyros has just failed test 123 so a step 126 will cause digital fault to be indicated (on the digital fault indicator 94, in the control panel 60, FIG. 1). But if test 125 fails, this would indicate that one of the lower numbered analog gyros has failed, so that a step 127 will cause setting of the analog fault indicator (96, FIG. 1). By isolating faults to the analog or digital portions of the stability augmentation system, the pilot is guided to engage the remaining portion of the system.

Whenever test 123 is negative, indicating a fault, the remaining ground test (comparing commands dependent upon nominal inputs and comparing commands dependent upon test inputs) are not performed, so the program advances through the return point 106.

Assuming now that each of the gyros is operating properly, test 123 will be affirmative for each gyro, causing a test 128 to be reached to determine if the gyro pointer has reached 6 or not. When it has not, step 122 will advance the pointer and the next gyro will be tested by test 123. But will test 128 is affirmative, this means each of the gyros has had its nominal output compared with its test output and has been found to be operative. Then, a command comparison subroutine 129 is commenced by a step 130 resetting an axis pointer, that keeps track of testing of each of the three axes, such as in the order of pitch, roll and yaw. Then a step 131 advanced the axis pointer to point to the first axis (such as pitch). A step 132 compares the command generated by the analog portion of that axis with the command generated by the digital portion of that axis, such as by comparing feedback signals from the two valve coils (for the yaw axis, comparing the signal on the line 77 with the signal on the line 78, FIG. 1; and similar lines for the other two axes). If the two commands are not nearly identical, the comparision test 132 will be negative and step 127 will indicate an analog fault. This is valid because the gyros have all been indicated as being properly operative, since an affirmative result from test 123 is required with respect to all six gyros before test 130 can be reached; and, the ground testing is not even performed unless test 104 indicates that the computer is healthy. By providing adequate self-test, the self-test indications can be made to be 99% or more reliable; and, whenever the self-test indication showed the computer to be operating properly, the likelihood that any undetected failure would affect all three axes at once is even more remote. Therefore, it is valid to assume that any failure of the analog command of any axis to be within limits of the digital command for that axis is as a result of an analog fault (since the test is not made unless the computer self-test indicates that the computer is healthy).

If the comparative test 132 indicates that the analog command and the digital command are within tolerance of each other, then a test 133 determines if all three axes have been tested, and if not step 131 and test 132 are repeated for the next axis. But when all the commands for three axes have been successfully compared, then a test 134 determines whether the ground flag is still set or not. If it is set, this indicates that this is the first pass through the command comparison subroutine 129 during a complete ground test, and that therefore another command comparison must be made. Thus an affirmative result from test 134 causes a step 135 to reset the ground flag, and then the subroutine 129 is repeated, this time comparing analog and digital commands for each three axes generated as a result of the test output of the gyro (in contrast with the nominal outputs of the gyros which were compared in a preceding pass through the subroutine 129). If there is any failure of the commands to compare properly with each other, the analog fault is indicated by step 127, as described previously. But if all three commands compare favorably, test 133 will be affirmative and, in the second pass, test 134 will be negative so that other parts of the program are reached through the return point 106.

When the aircraft is in flight, the commands for each axis are compared as described with respect to preflight tests hereinbefore; in addition, the outputs of the gyros are compared and if they don't compare within the tolerance of each other, they are then compared with pseudo rate gyro signals derived from the vertical gyro and the heading gyro of the aircraft, as is described in the aforementioned digital patent disclosure. Specifically, if test 108 indicates that the aircraft is not on the ground, then in-flight testing is performed. As with the preflight (on the ground) test, the gyros are tested first, and if no gyro error is noted, then any failure of the commands for a given axis to agree suitably with each other can be indicated as a fault in the analog system, since presumably the digital system is operating properly, as indicated by test 104, prior to making the in-flight tests.

Specifically, in-flight tests begin with a subroutine 138 reading the gyro outputs and the command outputs. Then a pointer used to keep track of the three axes is reset in a step 139, and the pointer is advanced to point to the first axis (such as pitch) in a step 140. Then the output of the rate gyro in the digital portion of the axis identified by the axis pointer is compared with the gyro output for the analog portion of that axis. If the gyro outputs are not within a predetermined amount of each other, the comparative test 141 will be negative and a step 142 will set a code indicating that gyro failure has occurred. The code may also include that axis indicated by the axis pointer to help identify which axis had the gyro failure. Then a subroutine 143 may calculate a suitable angular rate for the axis involved (pitch, roll or yaw) utilizing the Euler coefficients which were generated in the subroutine 103. As is known in the art, the vertical gyro and heading gyro keep track of roll and pitch angle and heading angle with respect to earth coordinates. By taking all three of these into account, converting them to aircraft coordinates, and taking the derivatives thereof, pseudo rates for any of the axes (pitch, roll and yaw) are readily calculated. The rate for the particular axis identified by the axis pointer is compared in a comparison step 141 with the rate gyro of the axis being examined which is connected to the digital portion and with that rate gyro which is connected to the analog portion. Depending upon whether the digital or the analog gyro is found to be closest to the calculated pseudoangular rate, either the analog or digital fault is indicated by corresponding step 145, 146. And, the gyro found closest by the comparative test 44 is further compared with the pseudo rate in a corresponding comparative test 148, 149 to see if the closest gyro is in fact close enough to the pseudo rate to be considered to be healthy. If not, then a corresponding step 150, 151 will also cause the digital or analog fault to be indicated. In other words if the closest gyro is not close enough to the pseudo rate, then both channels are indicated as having fault, and the program will advance through the return point 106. On the other hand, if one of the gyros is deemed to be close enough to the pseudo rate, then a test 152 determines if all three axes have been processed or not. If not, the routine reverts to step 140 to advance the axis pointer and to provide comparison of gyros with themselves and, if they are too far apart, with a calculated pseudo rate as described hereinbefore. Ultimately, assuming that the gyros either agree with each other or one of them agrees with the pseudo rate, test 152 will be affirmative, and the subroutine 129 for comparing generated commands will be reached. This operates the same as described hereinbefore, and any failure of the digital and analog commands for given axis to agree with each other is presumed to be an analog fault, which is established by a step 127. When the commands for all three axes have been successfully compared, test 134 will be reached; this will always be negative in the case of in-flight tests, since this flag is only set during ground testing. However, if desired, to cover the case where the status of the helicopter changes from being on the ground to not being on the ground, with both stability augmentation systems engaged, while the gyro test signal is still being generated, it may be desirable to provide steps between the negative result of test 108 and the subroutine 138 to reset the gyro test signal and reset the ground flag whenever test 108 is negative, thereby ensuring that the aircraft will not take off with test signals applied to the gyros, and that the program will proceed properly through test 134 when the aircraft is in flight. On the other hand, the preflight testing may be performed only in response to an affirmative call therefor by the pilot, such that after a few passes of preflight testing, the preflight testing could end, prior to takeoff. These are details of implementation, and form no part of the present invention.

In accordance with the invention, each gyro is tested again itself, with an without test inputs, while on the ground. Since this test will isolate to a particular gyro, and therefore an analog or digital portion of any axis, a subsequent failure in comparison of output commands can be relegated as being analog fault, due to self-testing of the computer. Similarly, because comparison of the gyros with each other (and in the event of disagreement, with a pseudo rate calculated from the vertical and heading gyros) is performed before command comparisons are made in flight, any failure in comparison of the commands can be relegated in the analog portion of the system, since the computer is deemed to be healthy once it passes self-test. Indications of which channel is at fault, whether it is caused by a rate gyro failure or by a failure in the commands to agree with each other, allows the pilot to select the other portion (digital or analog) which has not failed and indicated as at fault. Therefore, the helicopter can continue to have the use of stability augmentation, even after one of the dissimilar, redundant portions has failed. This invention not only provides a high degree of reliability, since it provides computer self-testing and computer analysis of relative health for both portions of the stability augmentation system, but it also provides a high degree of confidence that whichever stability systems are engaged are operating properly. This allows the pilot to direct his attention to other matters, rather than constantly wondering if one of the stability augmentation portions has failed, and the system is operating only on the other one, as may occur in some of the redundant systems known to the prior art. On the other hand, this invention avoids the automatic disengagement of both systems, which can occur in the system described in the aforementioned digital patent disclosure in the event that either computer senses a lack of agreement with the other while the other one has still not disabled itself.

The foregoing description is exemplary, and it should be understood that there are numerous variations which can be made in the hardware as well as modifications in the routines performed by the digital computer, while still attaining the desired result. Particularly, the exact nature of tests performed, the precise steps used in order to effect performance of these tests, and the manner of response to them, are all matters which can be varied in almost an infinite variety of ways by choices in particular programming of the digital computer, utilizing techniques and methods which are well within the skill of the art in the light of the teachings herein. Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. A dissimilar, redundant stability augmentation system operable in a plurality of controlled attitude axes of an aircraft, comprising:

a plurality of stability augmentation actuators each having a pair of electrical control inputs, each operable to provide a mechanical input to the corresponding one of said axes in response to the additive effects of signals applied to said pair of electrical control inputs thereof;

a plurality of analog amplifiers, one for each of said axes, each of said amplifiers being selectively connectable to one of the electrical inputs of the stability augmentation actuator of the corresponding axis;

a digital computer system having analog inputs and having an analog output for each of said axes, each of said outputs being selectively connectable to the other of said electrical inputs of the stability augmentation actuator of the corresponding axis, said computer system comprising means for reading in analog input signals and for providing corresponding stability augmentation command signals to related ones of said analog outputs;

a plurality of rate gyros, there being a pair of rate gyros corresponding to each of said attitude axes, one of the rate gyros of each pair having its output connected to the input of the amplifier of the corresponding axis of the aircraft, and the other rate gyro of each pair having its output connected to an analog input of said digital computer system;

characterized by each of said rate gyros being responsive to a test signal input to provide a predetermined output signal when it is functioning properly, said digital computer system being connected to the test signal input of each of said gyros, said one rate gyro of each pair also being connected to an analog input of said digital computer system, said aircraft having means for providing preflight indication that the aircraft is stationary on the ground, said digital computer system comprising means operable in response to said preflight indication for providing a test signal to each of said gyros, for reading the test output of each of said gyros with said test signal applied thereto, and for providing a fault indication in the event that the test output of any one of said gyros differs from a permissible value by a predetermined amount, and operable in the absence of said preflight indication for comparing the output of one gyro in each pair with the output of the other gyro in such pair and providing a fault manifestation in response to the outputs of a pair differing by a predetermined amount.

2. A stability augmentation system according to claim 1 further characterized by a feedback path from each electrical input of each of said stability augmentation actuators to said digital computer system, and said digital computer system comprising means for comparing the command signal provided to one electrical input of each actuator to the signal provided to the other electrical input of each actuator and for providing a fault indication in response to the signals provided to one of said actuators differing from each other by a predetermined amount.

* * * * *